(12) United States Patent
Naidu et al.

(10) Patent No.: US 10,247,115 B2
(45) Date of Patent: Apr. 2, 2019

(54) METHOD OF REDUCING ENGINE NOX EMISSIONS

(71) Applicant: FORD GLOBAL TECHNOLOGIES, LLC, Dearborn, MI (US)

(72) Inventors: Paspuleti Ashish Kumar Naidu, Basildon (GB); Ian Halleron, Chelmsford (GB); Peter George Brittle, Romford (GB); James Wright, Wanstead (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 140 days.

(21) Appl. No.: 15/233,329

(22) Filed: Aug. 10, 2016

(65) Prior Publication Data

US 2017/0045004 A1 Feb. 16, 2017

(30) Foreign Application Priority Data

Aug. 11, 2015 (GB) .................... 1514121.1

(51) Int. Cl.
*F02D 29/06* (2006.01)
*F02D 41/00* (2006.01)
(Continued)

(52) U.S. Cl.
CPC .............. *F02D 29/06* (2013.01); *F02B 63/04* (2013.01); *F02D 41/0007* (2013.01);
(Continued)

(58) Field of Classification Search
CPC .. F02D 29/06; F02D 41/0007; F02D 41/0055; F02D 41/0077; F02D 41/0255;
(Continued)

(56) References Cited

U.S. PATENT DOCUMENTS

| | | | |
|---|---|---|---|
| 5,265,418 A | 11/1993 | Smith | |
| 6,594,990 B2 | 7/2003 | Kuenstler et al. | |
| 6,829,888 B2 | 12/2004 | Kuenstler et al. | |
| 7,370,470 B2 | 5/2008 | Graupner et al. | |

(Continued)

FOREIGN PATENT DOCUMENTS

| | | |
|---|---|---|
| DE | 102007038242 A1 | 2/2009 |
| EP | 1182074 A2 | 2/2002 |

(Continued)

OTHER PUBLICATIONS

Combined Search and Examination Report dated Mar. 2, 2016 in Application No. GB1514121.1.

(Continued)

*Primary Examiner* — Audrey K Bradley
*Assistant Examiner* — Kelsey Stanek
(74) *Attorney, Agent, or Firm* — David Kelley; Brooks Kushman P.C.

(57) ABSTRACT

A system and method for increasing engine heating rate to facilitate early introduction of exhaust gas recirculation after a cold start include operating an electric machine connect to the engine to apply a load to the engine. The electric machine may be operated as a generator to produce an increased engine torque demand and increase the rate of engine heating until an engine temperature and an exhaust temperature exceed corresponding thresholds. Operation of the electric machine as a generator may be stopped in response to a battery state of charge exceeding a threshold, or engine load exceeding a threshold.

20 Claims, 2 Drawing Sheets

(51) Int. Cl.
  *F02D 41/02* (2006.01)
  *F02B 63/04* (2006.01)
  *F02D 41/06* (2006.01)
  *F02D 41/14* (2006.01)
  *F02N 11/04* (2006.01)

(52) U.S. Cl.
  CPC ..... *F02D 41/0055* (2013.01); *F02D 41/0077* (2013.01); *F02D 41/0255* (2013.01); *F02D 41/064* (2013.01); *F02D 41/068* (2013.01); *F02D 41/1446* (2013.01); *F02D 2041/026* (2013.01); *F02D 2200/021* (2013.01); *F02D 2200/0802* (2013.01); *F02D 2200/503* (2013.01); *F02D 2250/24* (2013.01); *F02N 11/04* (2013.01); *F02N 2200/061* (2013.01); *Y02T 10/26* (2013.01); *Y02T 10/47* (2013.01)

(58) Field of Classification Search
  CPC .. F02D 41/064; F02D 41/068; F02D 41/1446; F02D 2041/026; F02D 2200/021; F02D 2200/0802; F02D 2200/503; F02B 63/04; Y02T 10/26; Y02T 10/47
  USPC .................................................. 60/285, 284
  See application file for complete search history.

(56) References Cited

U.S. PATENT DOCUMENTS

| | | | |
|---|---|---|---|
| 8,042,326 | B2 | 10/2011 | Farell et al. |
| 8,555,615 | B2 | 10/2013 | Murata et al. |
| 2003/0056497 | A1* | 3/2003 | Kuenstler ............. F02D 41/024 60/284 |
| 2005/0034449 | A1 | 2/2005 | Frieden et al. |
| 2009/0033095 | A1* | 2/2009 | Aswani ................. B60W 10/06 290/2 |
| 2015/0047340 | A1* | 2/2015 | Ulrey ..................... F02B 47/08 60/600 |

FOREIGN PATENT DOCUMENTS

| | | |
|---|---|---|
| EP | 1452712 A1 | 9/2004 |
| JP | S5867955 A | 4/1983 |
| JP | 200297669 A | 10/2000 |

OTHER PUBLICATIONS

Great Britain Examination Report for Great Britain Application No. 1514121.1 dated Sep. 3, 2018.
Extended European Search Report for European Application No. 16275113.5 dated Dec. 23, 2016.

* cited by examiner

METHOD OF REDUCING ENGINE NOX EMISSIONS

CROSS-REFERENCE TO RELATED APPLICATIONS

This application claims foreign priority benefits under 35 U.S.C. § 119(a)-(d) to GB 1514121.1 filed Aug. 11, 2015, which is hereby incorporated by reference in its entirety.

TECHNICAL FIELD

This disclosure relates to a method for reducing NOx emissions from an engine after a cold start.

BACKGROUND

It is known from, for example, U.S. Pat. No. 6,829,888 that an electric machine can be used to assist with heating the exhaust gas flow from an engine to assist with catalyst light-off.

The use of high pressure exhaust gas recirculation (HPEGR) or low pressure exhaust gas recirculation (LPEGR) at the earliest possible moment during a vehicle drive cycle helps to reduce NOx emissions. Early introduction of EGR after engine starting has been used to reduce NOx emissions to satisfy emission requirements. The engine operating range in terms of engine speed and engine load and the temperature range over which EGR flow is used to reduce NOx have both increased to meet more recent emission requirements.

One problem associated with the early use of EGR is that it can result in combustion instability if the temperature of the gas inducted into the engine is low such as following a cold start.

A second problem associated with the early use of LP EGR in the case of an engine having forced induction using a compressor is that it can result in the formation of condensation upstream of the compressor. The formation of such condensation can seriously damage the fast rotating blades of the compressor.

SUMMARY

The inventors have recognized that a strategy similar to that used for exhaust gas heating to accelerate catalyst light-off such as proposed in U.S. Pat. No. 6,829,888 can be beneficially used to enable earlier introduction of exhaust gas recirculation.

In one or more embodiments, a method of reducing engine NOx emissions after a cold start facilitates the early use of exhaust gas recirculation without causing significant combustion instability or potentially damaging condensation.

According to one embodiment, a method of enabling earlier use of exhaust gas recirculation to reduce NOx emissions from an engine following a cold start of the engine includes identifying whether at least one of engine temperature and exhaust gas temperature is below a corresponding threshold for the use of exhaust gas recirculation, using an electric machine as a generator to apply a load to the engine to increase the rate at which the engine temperature and the exhaust gas temperature increase and, when the engine temperature and the exhaust gas temperature are above corresponding thresholds to permit effective use of exhaust gas recirculation, activating exhaust gas recirculation.

The use of the electric machine as a generator may be terminated when the engine temperature and the exhaust gas temperature are high enough to permit effective use of exhaust gas recirculation. Alternatively, the use of the electric machine as a generator may be terminated if a state of charge (SOC) of a battery connected to the electric machine reaches a limit.

The electric machine may be an integrated starter-generator drivingly connected to the engine. The engine temperature and the exhaust gas temperature may be high enough to permit effective use of exhaust gas recirculation when the use of exhaust gas recirculation will not cause combustion instability in the engine.

The engine may be a forced induction engine having a compressor, the exhaust gas recirculation may be a low pressure exhaust gas recirculation that returns exhaust gas to a position upstream from the compressor and the engine temperature and the exhaust gas temperature may be high enough to permit effective use of exhaust gas recirculation if the use of low pressure exhaust gas recirculation will not cause condensation to be inducted into the compressor.

In various embodiments, a motor vehicle includes an engine drivingly connected to an electric machine, an electronic controller and an exhaust gas recirculation system to recirculate exhaust gas from an exhaust side of the engine to an intake side of the engine, the exhaust gas recirculation system including an exhaust gas recirculation valve to control the flow of recirculated exhaust gas wherein the electronic controller is arranged to identify whether at least one of engine temperature and exhaust gas temperature is below a corresponding threshold for the use of exhaust gas recirculation, use the electric machine as a generator to apply a load to the engine to increase the rate at which the engine temperature and the exhaust gas temperature increase and, when the engine temperature and the exhaust gas temperature exceed corresponding thresholds to permit the effective use of exhaust gas recirculation, the electronic controller is programmed to activate exhaust gas recirculation by opening the exhaust gas recirculation valve.

The electronic controller may be programmed to terminate the use of the electric machine as a generator when the engine temperature and the exhaust gas temperature exceed corresponding thresholds to permit effective use of exhaust gas recirculation.

The electronic controller may be programmed to monitor the state of charge of a battery connected to the electric machine and may be further programmed to terminate use of the electric machine as a generator if a state of charge of a battery reaches a limit.

The electric machine may be an integrated starter-generator.

The engine temperature and the exhaust gas temperature threshold may be high enough to permit the effective use of exhaust gas recirculation when the use of exhaust gas recirculation will not cause combustion instability in the engine.

The engine may be a forced induction engine having a compressor to compress the flow of air entering the engine, the exhaust gas recirculation system may be a low pressure exhaust gas recirculation system that returns exhaust gas to an intake system for the engine at a position upstream from the compressor and the thresholds for the engine temperature and the exhaust gas temperature may be high enough to permit the effective use of exhaust gas recirculation if the use of low pressure exhaust gas recirculation will not cause the induction of condensation into the compressor.

The compressor may be part of a turbocharger having a turbine to drive the compressor and the exhaust gas may be extracted from an exhaust system of the engine at a position downstream from the turbine of the turbocharger.

The exhaust gas system may be a high pressure exhaust gas system, the engine may have a turbocharger having a compressor driven by a turbine for increasing the flow of air through an intake system of the engine, recirculated exhaust gas may be extracted from an exhaust system of the engine at a position upstream from the turbine of the turbocharger and be returned to the intake system of the engine downstream from the compressor.

DETAILED DESCRIPTION

As required, detailed embodiments are disclosed herein; however, it is to be understood that the disclosed embodiments are merely representative and may be embodied in various and alternative forms not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Figure 1:
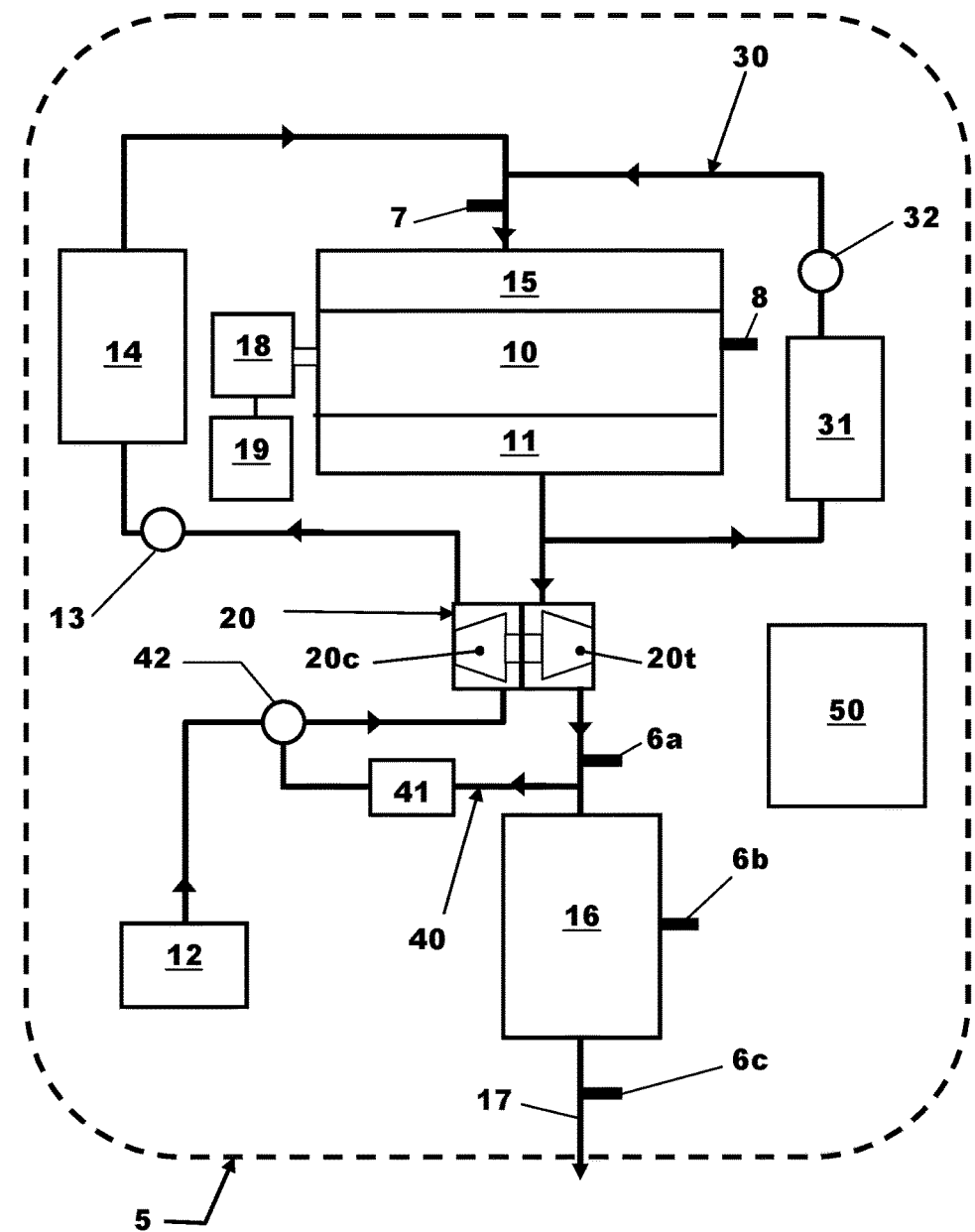
FIG. 1 is a schematic diagram of a motor vehicle according to one embodiment.

With reference to FIG. 1 there is shown a motor vehicle 5 having a forced induction engine in the form of a turbocharged engine 10. The engine 10 has an intake system through which atmospheric air flows to the engine 10. The intake system comprises a number of intake conduits, an air filter 12, a compressor 20c of a turbocharger 20, a throttle valve 13, an intercooler 14 and an intake manifold 15. The intake conduits are used to connect together the various components of the intake system used to flow air to the engine 10.

Air enters the intake system via the air filter 12, is compressed by the compressor 20c and flows via the throttle valve 13 to the intercooler 14 and then to the intake manifold 15 of the engine 10. Fuel is injected into the engine 10 by a number of fuel injectors (not shown) and the products of combustion in the form of exhaust gas flow via an exhaust manifold 11 to a turbine 20t of the turbocharger 20. After passing through the turbine 20t the exhaust gas flows through one or more aftertreatment devices 16 to a tailpipe 17 and from the tailpipe 17 to atmosphere.

A HPEGR circuit 30 is arranged to extract exhaust gas from a position between the exhaust manifold 11 and the turbine 20t and flow the extracted exhaust gas via an exhaust gas cooler 31 to a high pressure exhaust gas recirculation valve 32. When the high pressure exhaust gas recirculation valve 32 is open, the high pressure exhaust gas can flow into the intake path upstream from the intake manifold 15 and downstream from the intercooler 14 and the compressor 20c.

A LPEGR circuit 40 is arranged to extract exhaust gas from a position between the turbine 20t and the aftertreatment devices 16 and flow the extracted exhaust gas via an exhaust gas cooler 41 to a low pressure exhaust gas recirculation valve 42. When the low pressure exhaust gas recirculation valve 42 is open, the low pressure exhaust gas can flow into the intake path.

It will be appreciated that if the aftertreatment devices 16 include a particulate filter then the exhaust gas for the LPEGR could be extracted downstream from the particulate filter as that would reduce the amount of soot reaching the compressor 20c and reduce contamination of the blades of the compressor 20c. Alternatively, if no aftertreatment particulate filter is present, a particulate filter could be included between the exhaust gas cooler 41 and the extraction point of the exhaust gas.

An electric machine is drivingly connected to the engine 10 and in the case of this example is in the form of an integrated starter-generator 18. The integrated starter-generator 18 is, in the case of this example, belt driven from a crankshaft of the engine 10 but it will be appreciated that it could alternatively be chain driven or gear driven.

The integrated starter-generator 18 can be used to generate electricity or generate torque depending upon the mode in which it is operating. A battery 19 is connected to the integrated starter-generator 18 along with associated control electronics formed as part of a central electronic controller 50. When the integrated starter-generator 18 is operating as a generator it charges the battery 19 and, when the integrated starter-generator 18 is operating as a motor, the battery 19 provides electrical energy to the integrated starter-generator 18. The electronic controller 50 monitors the state of charge (SOC) of the battery 19 and controls the integrated starter-generator 18 to ensure that the state of charge of the battery remains within safe upper and lower limits.

The electronic controller 50 is arranged or programmed to control operation of the integrated starter-generator 18, the operating state of the high pressure exhaust gas recirculation valve 32, the operating state of the low pressure exhaust gas recirculation valve 42 and the rotary position of the throttle valve 13. It will be appreciated that the high and low pressure exhaust gas recirculation valves 32 and 42 will have at least fully open and fully closed operating states and in most cases partially open/closed operating states. The electronic controller 50 is also used to control normal operation of the engine.

The electronic controller 50 receives inputs from a number of sensors such as, for example, a mass air flow sensor (not shown), an engine speed sensor (not shown), an accelerator pedal position sensor (not shown), a Lambda sensor (not shown), three exhaust gas temperature sensors 6a, 6b, 6c, an intake temperature sensor 7 and an engine cylinder head temperature sensor 8. The connections between the electronic controller 50 and the various sensors and components it controls are not shown in FIG. 1 to simplify and improve understanding of the figure.

Figure 2:
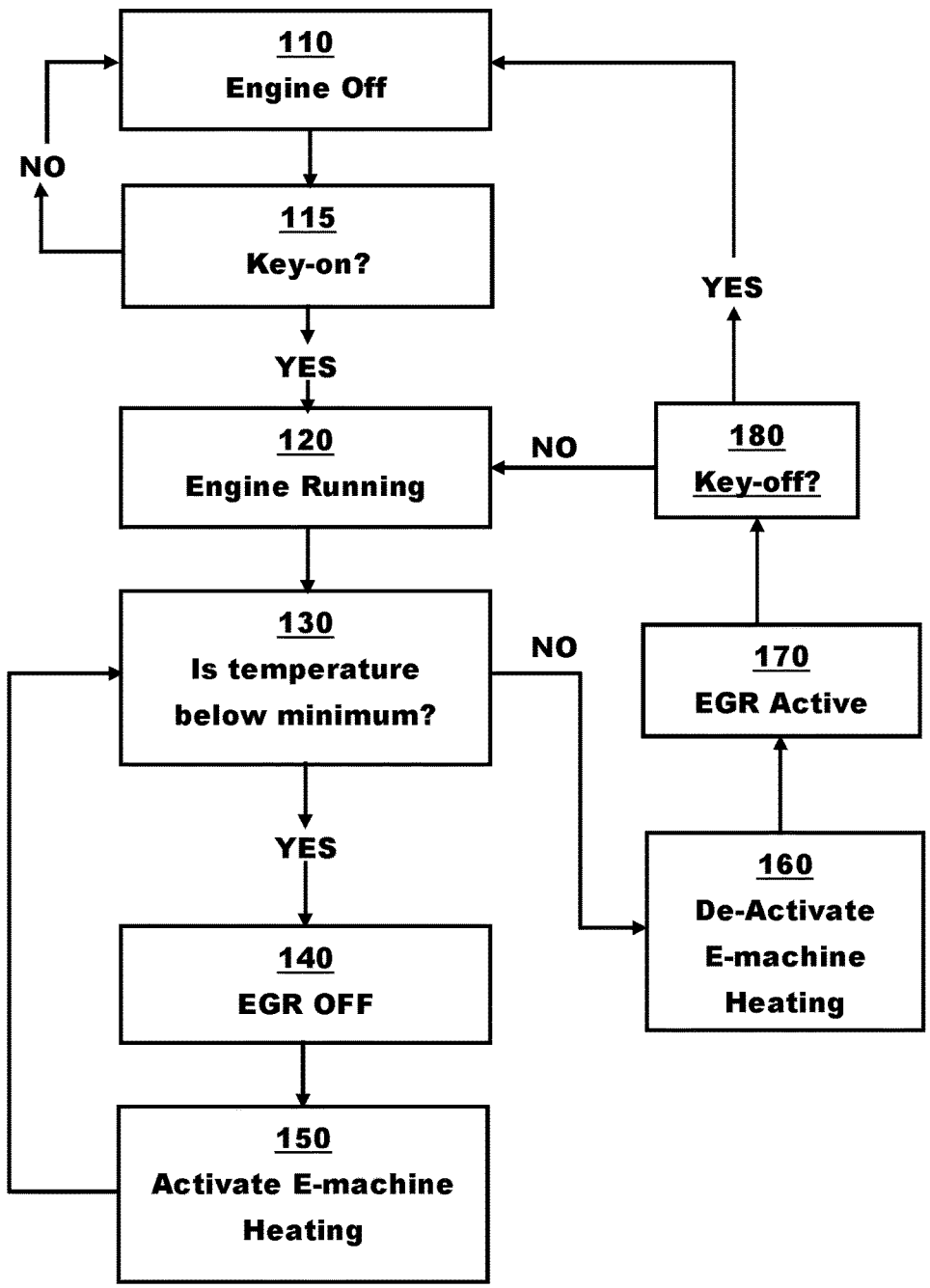
FIG. 2 is a high level flow chart illustrating operation of a system or method of enabling earlier use of exhaust gas recirculation to reduce NOx emissions from an engine following a cold start of the engine in accordance with various embodiments.

It will be appreciated that the electronic controller 50 may comprise several interconnected electronic controllers and need not be a single unit as shown in FIG. 1. Control logic, functions, algorithms, or methods performed by controller 50 may be represented by a flow chart such as illustrated in FIG. 2. This flowchart provides a representative control strategy, algorithm, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

In one embodiment, the electronic controller 50 is programmed with instructions to implement one or more algorithms to operate as described below.

When the temperature of the engine 10 is sensed to be below a normal operating temperature following an engine start, the vehicle is controlled to provide heating of the engine to reduce the time delay between engine start and the time that EGR can be used to help reduce NOx emissions. When deciding whether exhaust gas recirculation can be used effectively, controller 50 determines when combustion is likely to be unstable and whether the recirculated exhaust gas will be hot enough to help with combustion stability.

Combustion will be unstable if in-cylinder gas temperatures are low which will be the case if the temperature of the engine is low. The engine temperature can be deduced by using the output from the cylinder head temperature sensor 8 (or an engine coolant sensor) which provides an indication whether the cylinder walls are cold and by using the intake temperature sensor 7 which provides an indication of whether the temperature of the inducted gas is low. A prediction can be made as to whether unstable combustion would be likely from the use of EGR based on these measurements.

A further factor to be considered is whether the temperature of the exhaust gas is high enough to increase the inducted gas temperature if EGR is used. The temperature of the exhaust gas can be deduced from the outputs from the exhaust gas sensors 6a, 6b and 6c which provide an estimate of the effective exhaust gas temperature. Although three sensors are used in the case of this example it will be appreciated that only a single exhaust gas temperature sensor can be used.

It will be appreciated that there is a trade-off between combustion stability and mixture dilution that may be taken into account by controller 50 when deciding whether to use EGR, and the amount of EGR to use. That is to say, adding hot recirculated exhaust gas will increase the mobility of the molecules of fuel and air and therefore helps improve combustion stability but the addition of inert gas to the intake fuel/air mixture will dilute it and so the benefit of adding the hot recirculated exhaust gas has to be weighed against the diluting effect of the inert gas.

However, in all cases it is advantageous to speed up the process of heating of the engine 10 and the electronic controller 50 is programmed to operate the integrated starter-generator 18 as a generator to do this.

The use of the integrated starter-generator 18 as a generator will increase the load upon the engine 10 and this will result in an increased torque demand for the engine 10 which is met by supplying more fuel to the engine 10. The extra fuel increases the temperature of the engine and the temperature of the exhaust gas more quickly than it would if the air/fuel ratio were to be optimized for good fuel economy as is normally the case.

As referred to above, the electronic controller 50 is arranged to use the temperature sensors 6a, 6b and 6c to sense the temperature of the exhaust gas and, when the sensed exhaust gas temperature is above a temperature limit ($T_{HP}$) below which combustion instability will likely be caused if HPEGR is used, the electronic controller 50 is programmed to open the high pressure exhaust gas recirculation valve 32.

The electronic controller 50 in the case of this example is further programmed to, when the sensed exhaust gas temperature is above a temperature limit ($T_{LP}$) below which condensation is likely to be caused if LPEGR is used, open the low pressure exhaust gas recirculation valve 42.

It will be appreciated that the temperature of the LPEGR gas will be lower than the temperature of the HPEGR gas for the same exhaust gas temperature due to the difference between the HPEGR gas flow path from the exhaust side of the engine 10 to the intake side of the engine 10 and the LPEGR gas flow path from the exhaust side of the engine 10 to the intake side of the engine 10.

Electronic controller may be programmed to use LPEGR rather than HPEGR whenever possible because LPEGR provides a potential fuel economy benefit and is better mixed with atmospheric air. As such, HPEGR is sometimes terminated as soon as LPEGR can be utilized. The electronic controller 50 is further programmed to stop the use of the integrated starter-generator 18 as a generator when at least one of several conditions is present as described immediately below.

The use of the electric machine to increase engine load and an engine torque request may be stopped in response to the temperature of the exhaust gas exiting the engine 10 being above the low pressure and high pressure temperature limits ($T_{LP}$) and ($T_{HP}$), respectively, and the temperature of the engine 10, as sensed by the cylinder head sensor 8 and the intake temperature sensor 7, exceed predefined temperature limits. In addition, use of the electric machine to increase engine loading may be stopped in response to the load applied to the engine 10 increasing to a level where the engine 10 is warming up sufficiently rapidly that additional heating is not required. Furthermore, use of the electric machine to increase engine loading may be stopped if the state of charge (SOC) of the battery 19 reaches an upper charge limit indicating that there is substantially no capacity left in the battery 19 to store further electrical energy.

It will be appreciated that the systems and methods of various embodiments may include an engine having only low pressure EGR or only high pressure EGR. Similarly, various embodiment may include an engine with forced induction or without forced induction.

With reference to FIG. 2, a flowchart illustrates operation of a system or method for reducing NOx emissions from an engine such as the engine 10. The method starts in box 110 with the engine 10 not running that is to say, the engine 10 is 'Off'. The method advances to box 115 to check whether a key-on event has occurred. A 'key-on' event is an event that will change the state of the engine 10 from 'Off' to 'On'. That is to say, the engine 10 following a 'key-on' event will be running. Although in some cases a 'key-on' event is the result of a driver of a vehicle, such as the vehicle 5, activating an ignition switch, it will be appreciated that the specific mechanism used to start the engine 10 is not important to the operation of the system or method.

If box 115 determines there has been no 'key-on' event it will return to box 110 and the engine 10 remains in the 'Off' state. If box 115 determines there has been a 'key-on' event then the engine 10 will be started and the method advances to box 120 where the engine 10 is now running.

From box 120 the method advances to box 130 to check whether the current engine temperature as sensed by the intake temperature sensor 7 and the cylinder head sensor 8 and the current exhaust gas temperature as measured by one or more exhaust gas sensors 6a, 6b, 6c are below minimum effective EGR usage temperatures.

It will be appreciated that, in the case of the exhaust gas temperature, there could be a single temperature limit or multiple temperature limits. For example, if the engine 10 has, as shown in FIG. 1, both low pressure and high pressure EGR circuits, then the exhaust gas temperature required to prevent unstable combustion could be different to that required to prevent condensation upstream from a compressor, such as the compressor 20c.

Box 130 therefore represents tests to determine whether the current measured temperatures are above or below predefined limits and based upon the result of these tests the method either advances to box 140 or 160.

If one or more of the current measured temperatures is below the predefined limit for that parameter, the method advances to box 140 where EGR flow is prevented by, for example, closing or keeping closed EGR flow control valves such as the HPEGR and LPEGR valves 32 and 42 shown on FIG. 1. Opening the HPEGR and LPEGR valves 32 and 42 at this time would likely result in combustion instability and/or condensation being inducted into the compressor 20c.

The method then advances from box 140 to box 150 where an electric machine, such as the integrated starter-generator 18, is operated as a generator to load the engine 10. The additional load applied by the integrated starter-generator 18 will cause the engine temperature and the exhaust gas temperature to increase more rapidly than would normally be the case.

From box 150 the method returns to box 130 to recheck the measured engine and exhaust gas temperatures and will cycle around the boxes 130, 140 and 150 until the measured engine and exhaust gas temperatures exceed the predefined temperature limit for that respective parameter.

If in box 130 all of the measured engine and exhaust gas temperatures exceed their respective temperature limit, the method will advance to box 160.

In box 160 when exhaust gas heating by the use of the integrated starter-generator 18 is already active then it is deactivated and the integrated starter-generator 18 is then controlled normally to meet the demands of the vehicle 5.

However, if no exhaust gas heating is active when box 160 is entered, because the route to box 160 is from box 120 to box 130 and then to box 160, the integrated starter-generator 18 is controlled normally to meet the demands of the vehicle 5.

Irrespective of the route followed to reach box 160, from box 160 the method advances to box 170 where EGR is activated. That is to say, exhaust gas recirculation flow is permitted. It will be appreciated that if the engine 10 is fitted with low and high pressure EGR then in box 170 it could be LPEGR that is enabled, HPEGR that is enabled, or both, depending upon the temperature limit that has been reached.

From box 170 the method advances to box 180 where it is checked whether a 'key-off' event has occurred and if it has the method returns to box 110 with the engine 10 'Off' and if it has not, the method returns to box 120 with the engine 10 running.

It will be appreciated that as soon as the engine 10 has warmed up sufficiently, the tests in box 130 will always result in the method advancing to box 160 and during normal hot running of the engine the method will therefore cycle continuously through boxes 120, 130, 160, 170 and 180.

It will be appreciated that in addition to the tests described in box 130 there could be additional tests used to determine whether the use of the integrated starter-generator 18 should be terminated such as, for example, whether the state of charge of the battery 19 has reached an upper limit or whether the torque demand upon the engine 10 is sufficiently high that additional heating is no longer required.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A method for controlling a vehicle having an integrated starter-generator coupled to an engine having exhaust gas recirculation (EGR), comprising:
    operating, by a controller, the integrated starter-generator responsive to at least one of engine temperature and exhaust gas temperature being below a corresponding threshold to increase engine loading after starting the engine, and
    activating the EGR in response to both the exhaust gas temperature and the engine temperature exceeding corresponding thresholds.

2. The method of claim 1 wherein operating the integrated starter-generator comprises operating the integrated starter-generator as a generator.

3. The method of claim 2 further comprising terminating operation of the integrated starter-generator as a generator in response to the engine temperature and the exhaust gas temperature exceeding the corresponding thresholds.

4. The method of claim 2 further comprising stopping the operating of the integrated starter-generator as a generator in response to a state of charge of a battery connected to the electric machine exceeding a corresponding threshold.

5. The method of claim 1 wherein the integrated starter-generator is drivingly connected to the engine to start the engine.

6. The method of claim 1 wherein the engine comprises a compressor, the exhaust gas recirculation comprises a low pressure exhaust gas recirculation that returns exhaust gas to a position upstream from the compressor, and the engine temperature threshold and the exhaust gas temperature threshold are selected such that the low pressure exhaust gas recirculation will not cause condensation to be inducted into the compressor.

7. A vehicle comprising:
   an electric machine;
   an engine connected to the electric machine and having an exhaust gas recirculation system with a valve to control flow of exhaust between engine exhaust and intake; and
   a controller programmed to operate the electric machine responsive to engine or exhaust gas temperature being below associated thresholds to increase engine load, and to activate the valve in response to the engine and exhaust gas temperatures exceeding the thresholds.

8. The vehicle of claim 7 wherein the controller is further programmed to increase engine torque to satisfy the engine load increase.

9. The vehicle of claim 7 wherein the electric machine comprises an integrated starter-generator.

10. The vehicle of claim 7, wherein the controller is further programmed to operate the electric machine as a generator to increase the engine load.

11. The vehicle of claim 10 wherein the controller is further programmed to stop operating the electric machine as a generator in response to the engine and exhaust gas temperatures exceeding the thresholds.

12. The vehicle of claim 10 further comprising a battery connected to the electric machine, the controller further programmed to stop operating the electric machine as a generator in response to a state of charge of the battery exceeding a battery SOC threshold.

13. The vehicle of claim 7 further comprising a compressor to compress flow of air entering the engine, wherein the exhaust gas recirculation system is a low pressure exhaust gas recirculation system that returns exhaust gas to the intake at a position upstream from the compressor.

14. The vehicle of claim 13 wherein the compressor is part of a turbocharger having a turbine to drive the compressor and the exhaust gas is extracted from an exhaust system of the engine at a position downstream from the turbine of the turbocharger.

15. A method for controlling a vehicle including an electric machine coupled to an engine having exhaust gas recirculation (EGR), comprising:
   in response to at least one of engine and exhaust gas temperature being below associated thresholds after starting the engine using the electric machine,
   deactivating EGR and operating, by a controller, the electric machine as a generator to load the engine until the engine and exhaust gas temperatures exceed the associated thresholds, then activating EGR.

16. The method of claim 15 wherein activating EGR comprises controlling an associated EGR valve to allow exhaust gas to flow from an exhaust to an intake of the engine.

17. The method of claim 15 further comprising stopping the operating of the electric machine as a generator in response to a state of charge of a battery connected to the electric machine exceeding a threshold.

18. The method of claim 15 further comprising stopping the operating of the electric machine as a generator in response to engine load exceeding an associated threshold.

19. The method of claim 15 wherein the electric machine comprises an integrated starter-generator.

20. The method of claim 15 further comprising increasing engine fueling to satisfy the load associated with operating the electric machine as a generator.

* * * * *